(12) United States Patent
Senger et al.

(10) Patent No.: US 6,988,605 B2
(45) Date of Patent: Jan. 24, 2006

(54) METHOD AND DEVICE FOR OPERATING A CLUTCH

(75) Inventors: Karl-Heinz Senger, Löchgau (DE); Peter Baeuerle, Ludwigsburg (DE); Bram Veenhuizen, Goirle (NL); Engbert Spijker, Helmond (NL); Gert-Jan Van Spijk, Drunen (NL)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/130,379

(22) PCT Filed: Aug. 31, 2001

(86) PCT No.: PCT/DE01/03357
§ 371 (c)(1),
(2), (4) Date: Dec. 26, 2002

(87) PCT Pub. No.: WO02/23059
PCT Pub. Date: Mar. 21, 2002

(65) Prior Publication Data
US 2004/0074734 A1 Apr. 22, 2004

(30) Foreign Application Priority Data
Sep. 15, 2000 (DE) ............... 100 45 757

(51) Int. Cl.
F16D 48/06 (2006.01)

(52) U.S. Cl. ............... 192/103 F
(58) Field of Classification Search ........... 192/12 C, 192/103 F, 109 F; 477/176
See application file for complete search history.

(56) References Cited

U.S. PATENT DOCUMENTS

| | | | |
|---|---|---|---|
| 5,176,234 A | * 1/1993 | Reik et al. | 192/53.2 |
| 5,433,677 A | * 7/1995 | Petersmann et al. | 477/169 |
| 5,630,773 A | 5/1997 | Slicker et al. | |
| 5,719,768 A | * 2/1998 | Tashiro et al. | 701/67 |
| 5,743,366 A | * 4/1998 | Stoever et al. | 192/12 C |
| 6,047,800 A | * 4/2000 | Kosik et al. | 192/3.57 |
| 6,050,379 A | * 4/2000 | Lyon | 192/54.1 |
| 6,640,951 B2 | * 11/2003 | Bamberger et al. | 192/85 R |
| 6,659,253 B2 | * 12/2003 | Dominke et al. | 192/103 F |

FOREIGN PATENT DOCUMENTS

| | | |
|---|---|---|
| DE | 195 04 847 | 9/1995 |
| DE | 197 51 455 | 5/1999 |

\* cited by examiner

Primary Examiner—Saúl Rodriguez
(74) Attorney, Agent, or Firm—Kenyon & Kenyon

(57) ABSTRACT

A method and device for operating a clutch between an internal combustion engine and at least one driven wheel of a vehicle, a torque being transmitted between the internal combustion engine and the driven wheel by pressing the clutch together via an application force or an application pressure, and the application force or the application pressure being controlled as a function of a clutch slip in the clutch when the torque is transmitted between the internal combustion engine and the driven wheel and a setpoint clutch slip.

7 Claims, 8 Drawing Sheets

_US 6,988,605 B2_

METHOD AND DEVICE FOR OPERATING A CLUTCH

FIELD OF THE INVENTION

The present invention relates to a method and a device for operating a clutch between an internal combustion engine and at least one driven wheel of a vehicle, a torque being transmitted between the internal combustion engine and the driven wheel by pressing the clutch together via an application force or an application pressure.

BACKGROUND INFORMATION

If a clutch is operated with slip, it is possible to draw inferences concerning the clutch torque transmitted if the coefficient of friction is known. The intended use of this torque information is to determine the transmission input torque. Precise knowledge of the transmission input torque is of particular significance for continuously variable transmissions (CVT) so that the safety pressure when controlling the belt tension of belt transmissions can be reduced and the transmission efficiency can be increased.

SUMMARY OF THE INVENTION

An object of the present invention is to improve the operation of a clutch.

The object is achieved by a method and a device for operating a clutch between an internal combustion engine and at least one driven wheel of a vehicle, a torque being transmitted between the internal combustion engine and the driven wheel to operate a clutch between an internal combustion engine and at least one driven wheel of a vehicle by pressing the clutch together via an application force or an application pressure, the application force or the application pressure being controlled or regulated as a function of a clutch slip in the clutch when the torque is transmitted between the internal combustion engine and the driven wheel, and a setpoint clutch slip.

In an advantageous embodiment of the present invention, the application force or the application pressure is controlled or regulated as a function of the difference between the clutch slip and the setpoint clutch slip.

In a further advantageous embodiment of the present invention, the application force or the application pressure is regulated by a slip controller.

In a further advantageous embodiment of the present invention, the application force or the application pressure is regulated by an inverse clutch model which calculates the application force or the application pressure as a function of the torque transmitted via the clutch.

The device according to the present invention for operating a clutch between an internal combustion engine and at least one driven wheel of a vehicle, in which a torque is transmitted between the internal combustion engine and the driven wheel by pressing the clutch together via an application force or an application pressure, is provided with a slip controller to regulate the application force or the application pressure as a function of a clutch slip in the clutch when the torque is transmitted between the internal combustion engine and the driven wheel, and a setpoint clutch slip.

In an advantageous embodiment of the present invention, the slip controller has an inverse clutch model to calculate the application force or the application pressure as a function of the torque transmitted via the clutch.

In a further advantageous embodiment of the present invention, the slip controller has a regulator to calculate a differential torque as a function of the clutch slip and the setpoint clutch slip.

In a further advantageous embodiment of the present invention, the input variable of the inverse clutch model is a function of the differential torque.

In a further advantageous embodiment of the present invention, the sum of the differential torque and the engine torque generated by the internal combustion engine is an input variable of the inverse clutch model.

In a further advantageous embodiment of the present invention, the coefficient of friction of the clutch is a parameter of the inverse clutch model.

In a further advantageous embodiment of the present invention, an adapter is provided to adapt the coefficient of friction of the clutch.

DETAILED DESCRIPTION

Figure 1:
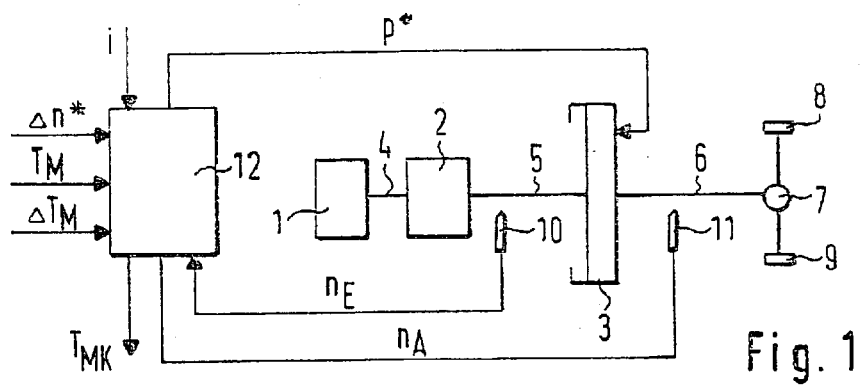
FIG. 1 shows a drive unit for a motor vehicle.

FIG. 1 shows a drive unit for a motor vehicle. Reference symbol 1 identifies an internal combustion engine which is connected to an automatic transmission 2 via a shaft 4. Automatic transmission 2 is designed in a particularly advantageous manner as a belt transmission. Automatic transmission 2 is connected via a clutch input shaft 5, a clutch 3, a clutch output shaft 6, and a differential 7 to driven wheels 8, 9 for the purpose of propelling the motor vehicle. By pressing clutch 3 together with an application pressure p, it is possible to adjust the torque which is transmitted via clutch 3. In order to adjust the torque transmitted via clutch 3, a clutch controller 12 is provided, which by specifying a setpoint application pressure p*, adjusts the application pressure in clutch 3. The application pressure is synonymous with an application force with which clutch 3 is pressed together.

Input variables in clutch controller 12 include rotational speed $n_E$ of clutch input shaft 5 which is measured by a rotational speed sensor 10, rotational speed $n_A$ of clutch output shaft 6 which is measured by a rotational speed sensor 11, transmission ratio i of automatic transmission 2 and a setpoint value $\Delta n^*$ for the clutch slip of clutch 3 (setpoint clutch slip) as well as optionally torque $T_M$ of internal combustion engine 1 as well as information $\Delta T_M$ relating to the inaccuracy of the information relating to torque $T_M$ of internal combustion engine 1. Clutch slip $\Delta n$ is defined as $$\Delta n = n_E - n_A$$

Torque $T_M$ of internal combustion engine 1 and information $\Delta T_M$ relating to the inaccuracy of the information relating to torque $T_M$ of internal combustion engine 1 are provided, for example, by an engine controller which is not illustrated.

Figure 2:
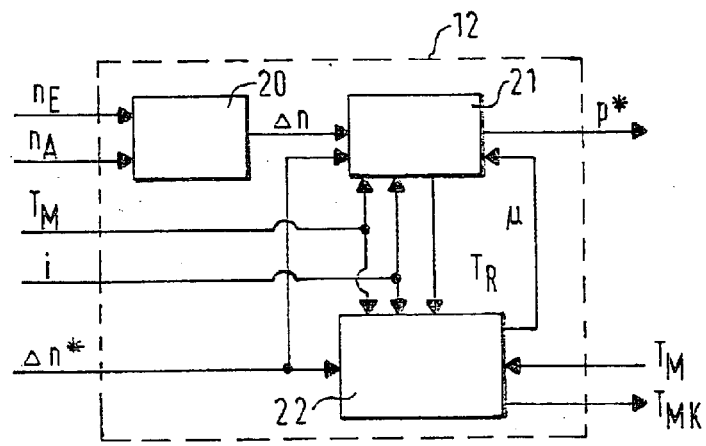
FIG. 2 shows a clutch controller.

FIG. 2 shows clutch controller 12. It has a subtracter 20, a slip controller 21 and an adapter 22. Slip controller 21 is explained in greater detail with reference to FIG. 3 and the adapter with reference to FIG. 4. The subtracter determines clutch slip $\Delta n$, which is the input variable in slip controller 21. Additional input variables of slip controller 21 include setpoint clutch slip $\Delta n^*$, engine torque $T_M$, transmission ratio i of automatic transmission 2 and coefficient of friction $\mu$. Coefficient of friction $\mu$ is formed by adapter 22. Input variables in adapter 22 include setpoint clutch slip $\Delta n^*$, transmission ratio i of automatic transmission 2, torque $T_M$ of internal combustion engine 1, information $\Delta T_M$ relating to the inaccuracy of the information relating to torque $T_M$ of internal combustion engine 1 as well as a differential torque $T_R$ which is formed by slip controller 21. In addition to coefficient of friction $\mu$, a corrected engine torque $T_{MK}$ is an additional reference quantity of adapter 22. Slip controller 21 also forms setpoint application pressure $p^*$.

Figure 3:
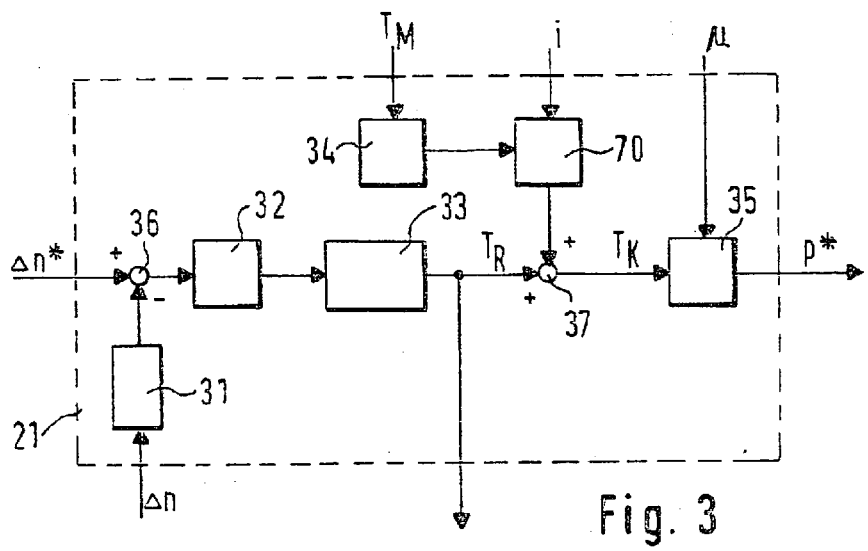
FIG. 3 shows a slip regulator.

FIG. 3 shows the internal structure of slip controller 21. Slip controller 21 has a filter 31 for the purpose of filtering clutch slip $\Delta n$. An adder 36 is used to produce the difference between setpoint clutch slip $\Delta n^*$ and clutch slip $\Delta n$ which is filtered by filter 31. This difference is negated by a negater 32 and is an input variable in a regulator 33, which in an advantageous embodiment, is designed as a PID controller. Differential torque $T_R$ is the output variable of controller 33.

A filter 34 is used to filter engine torque $T_M$. Engine torque $T_M$, which is filtered in this manner, is multiplied by transmission ratio i of automatic transmission 2 by a multiplier 70 and added to differential torque $T_R$ by an adder 37. The sum of differential torque $T_R$ and the engine torque, filtered and multiplied by transmission ratio i of automatic transmission 2, is clutch torque $T_K$ to be transmitted by clutch 3, which together with coefficient of friction $\mu$, is an input variable in an inverse clutch model 35. In inverse clutch model 35, the following equation is implemented in an exemplary embodiment:

$$p^* = \frac{1}{A_R}\left(\frac{T_K}{\mu \cdot r \cdot Z_R} + F_0\right)$$

A is the piston surface of clutch 3, $Z_R$ the effective friction radius of clutch 3, $Z_R$ the number of friction surfaces of clutch 3 and $F_0$ is the minimum force required for transmitting torque via clutch 3.

Figure 4:
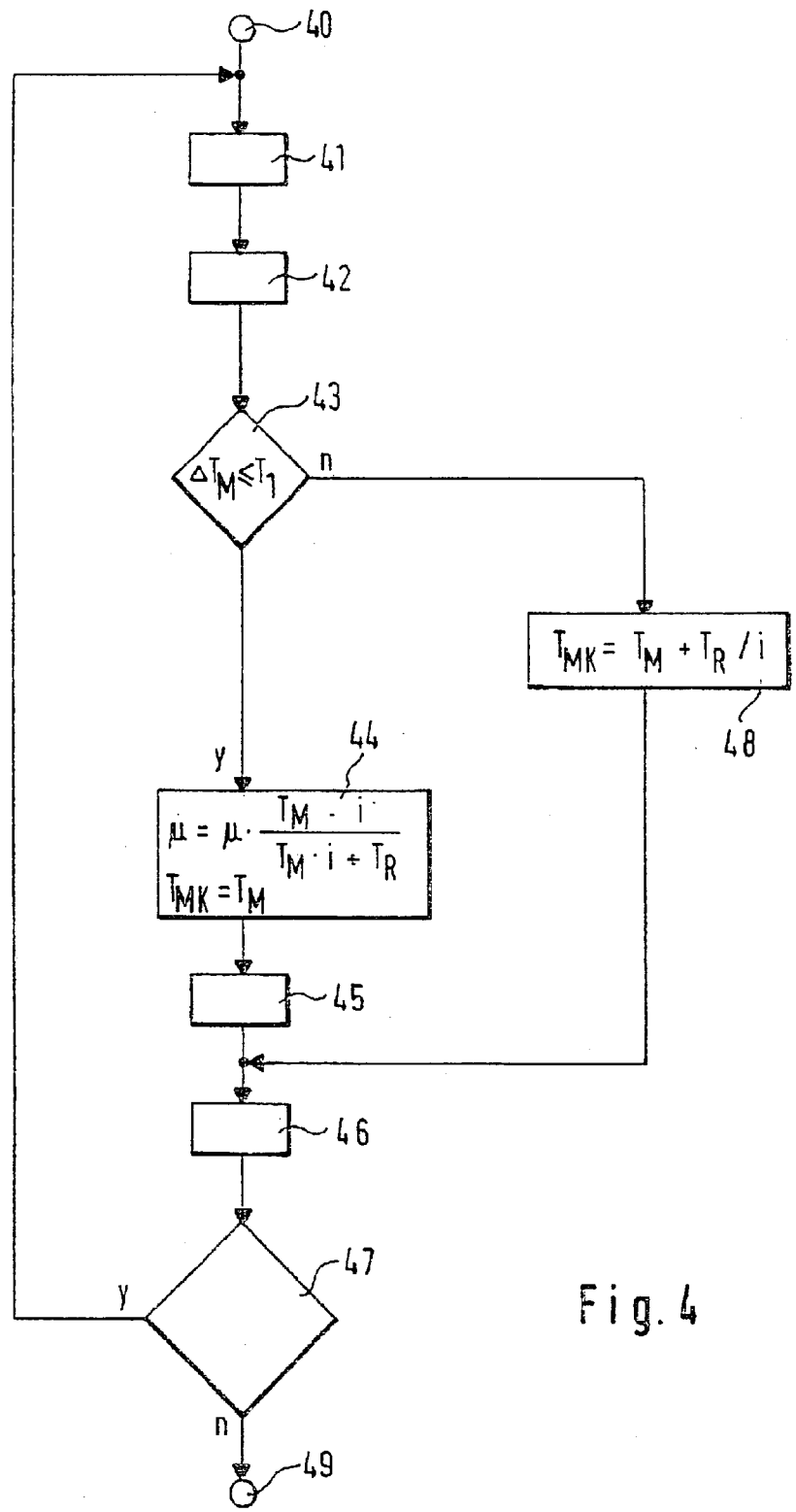
FIG. 4 shows a flow chart.

FIG. 4 shows a flow chart as an implementation of adapter 22. Reference symbol 40 identifies the start of the sequence and reference symbol 49 the end of the sequence. In step 41, information $T_M$ relating to the engine torque, information $\Delta T_M$ relating to the inaccuracy of the information relating to engine torque $T_M$, differential torque $T_R$, setpoint clutch slip $\Delta n^*$ and application pressure p are input.

In a subsequent step 42, a coefficient of friction $\mu$ is formed from setpoint clutch slip $\Delta n^*$ and application pressure p. In an advantageous manner, this is achieved by a coefficient of friction-slip characteristic curve which is a function of application pressure p. A characteristic curve of this type is illustrated for example in FIG. 5 and is identified by reference symbol 50.

Step 42 is followed by interrogation 43 inquiring whether $$\Delta T_M \leq T_1$$

where $T_1$ is a (first) tolerance value. If $$\Delta T_M \leq T_1$$

then step 44 follows in which a new coefficient of friction $\mu$ of the clutch is formed according to $$\mu = \mu + \frac{T_M \cdot i}{T_M \cdot i + T_R}$$

and a corrected engine torque $T_{MK}$ is formed according to $$T_{MK} = T_M$$

Figure 5:
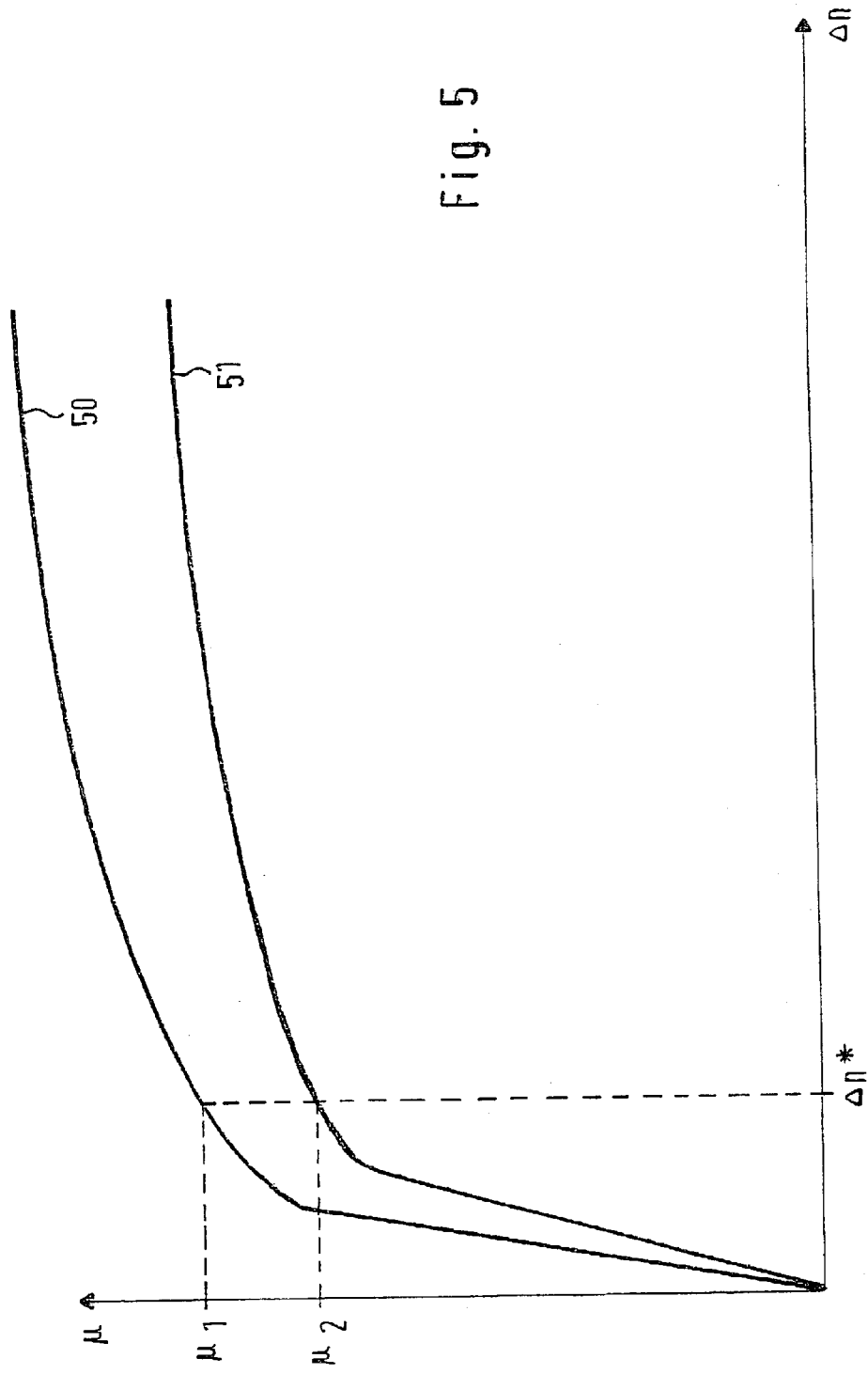
FIG. 5 shows a coefficient of friction-slip characteristic curve.

Step 44 is followed by step 45 in which the coefficient of friction-slip characteristic curve 50 as a function of the application pressure is modified in such a manner that the new value for coefficient of friction $\mu$ and setpoint clutch slip $\Delta n^*$ form a pair of values on modified coefficient of friction-slip characteristic curve 51. Step 45 is illustrated in FIG. 5. Reference symbol $\mu_1$ identifies the value for coefficient of friction $\mu$ for the relevant application pressure prior to execution of step 45 and $\mu_2$ identifies the value of coefficient of friction $\mu$ for the relevant application pressure after execution of step 45. Coefficient of friction $\mu_1$ is formed using characteristic curve 50 as a function of setpoint clutch slip $\Delta n^*$ (see step 42). In step 45, coefficient of friction-clutch slip characteristic curve 50 is modified in such a manner that a coefficient of friction-clutch slip characteristic curve 51 is produced, on which value 12 and setpoint clutch slip $\Delta n^*$ are a pair of values.
If $$\Delta T_M \leq T_1$$

is not fulfilled, then instead of step 44, step 48 follows in which a corrected engine torque $T_{MK}$ is equated to the sum of engine torque $T_M$ generated by internal combustion engine I and differential torque $T_R$ divided by transmission ratio i of automatic transmission 2:

$$T_M = T_M + T_R/i$$

Step 46 or 48 is followed by an interrogation 47 inquiring whether the preceding sequence is to be repeated. If this is the case, then step 41 follows. If this is not the case, the sequence is terminated.

Figure 6:
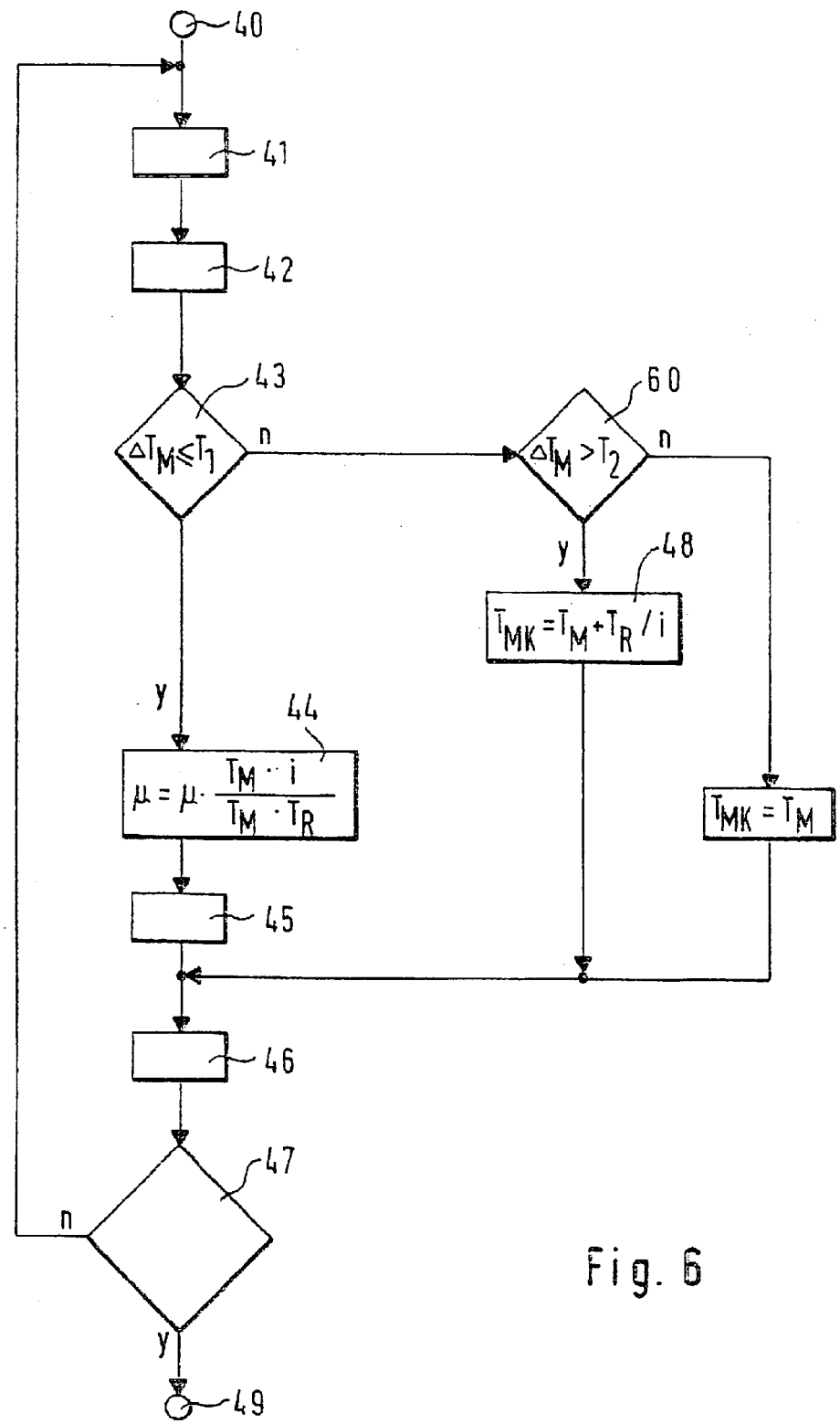
FIG. 6 shows a flow chart.

FIG. 6 shows a modification of the flow chart of FIG. 4. Interrogation 43 is not followed by step 48 but rather by an interrogation 60. Interrogation 60 inquires whether $$\Delta T_M > T_2$$

is fulfilled, $T_2$ being a second tolerance value. If this condition is fulfilled, then step 48 follows. However if the condition is not met, step 46 is performed.

Figure 7:
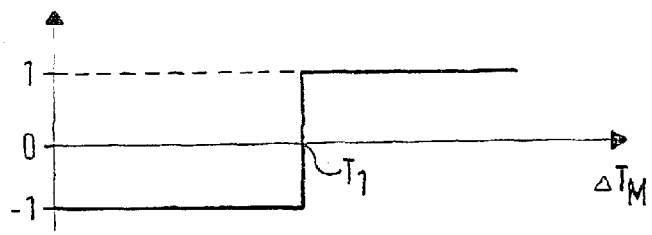
FIG. 7 shows an illustration of the flow chart of FIG. 4.
Figure 8:
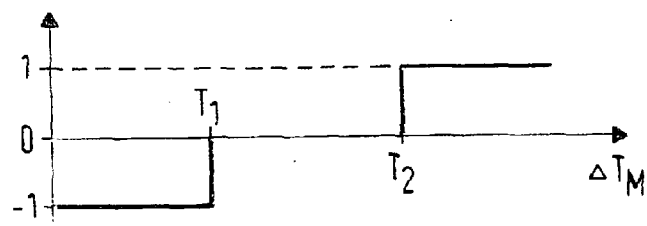
FIG. 8 shows an illustration of the flow chart of FIG. 6.

FIGS. 7 and 8 illustrate the differences between the flow charts as shown in FIG. 4 and FIG. 6. Information $\Delta T_M$ relating to the inaccuracy of the information relating to engine torque $T_M$ of internal combustion engine 1 is shown on the abscissa. The ordinate in FIG. 7 and FIG. 8 indicates which steps are executed. The value −1 symbolizes the execution of steps 44 and 45, the value 1 symbolizes the execution of step 48, and the value 0 represents neither the execution of steps 44 and 45 nor of step 48. Interrogation 43 in FIG. 4 corresponds to a binary switch. The combination of interrogations 43 and 60 in FIG. 6 corresponds to a three-point switch. Instead of these two straightforward switch types, it is naturally also feasible to perform complicated switching procedures, such as flowing transitions, which can be performed, e.g., by fuzzy techniques.

Figure 9:
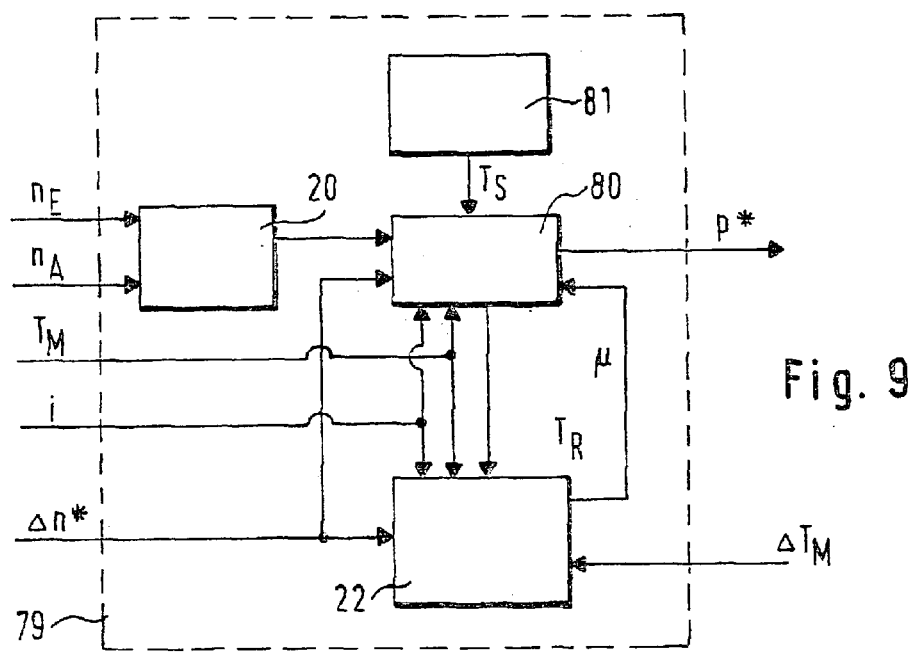
FIG. 9 shows an advantageous exemplary embodiment of a clutch controller.

FIG. 9 shows an advantageous exemplary embodiment of a clutch controller 79 which can be used as a substitute for clutch controller 12 of FIG. 1. Clutch controller 79 in FIG. 9 has a slip controller 80 and a protection device 81 to protect the drive unit, automatic transmission 2 in particular, against torque shocks. Shock torque $T_S$ is the output variable of protection device 81. In an advantageous embodiment, shock torque $T_S$ is calculated according to the following equation $$T_S = T_C - \Sigma_i J_i \cdot \frac{2\pi \cdot \Delta n_{max}}{\Delta t}$$

where $J_1$ is the moment of inertia of a 1st component of the drive unit on the side of clutch 3, on which internal combustion engine 1 is situated.

$\Delta n_{max}$ is the maximum permissible clutch slip $T_C$ is a constant torque $\Delta t$ is the period of time, in which a torque shock results in an increase in slip.

The introduction of torque shocks, in particular torque shocks which are introduced into the drive unit by virtue of driven wheels 8 and 9, may cause damage to automatic transmission 2. It is particularly critical to protect, for example, a variator of a CVT (continuously variable transmission). Even a brief period of slip in this type of belt transmission due to a torque shock can result in permanent damage to the belt transmission. Torque shocks of this type occur, for example, in a change from a roadway surface having a low coefficient of friction to a roadway surface having a high coefficient of friction. Examples include the change from an ice-covered roadway to a dry roadway or when crossing railroad tracks.

If the duration of slip $\Delta t$ is of secondary importance, then shock torque $T_S$ may be made equal to constant torque $T_C$.

In an advantageous embodiment, it is possible to transmit shock torque $T_S$ to a transmission controller so that, for example, the application pressure can be increased accordingly in a belt transmission. The application pressure required in the belt transmission is to be increased as a function of shock torque $T_S$.

Figure 10:
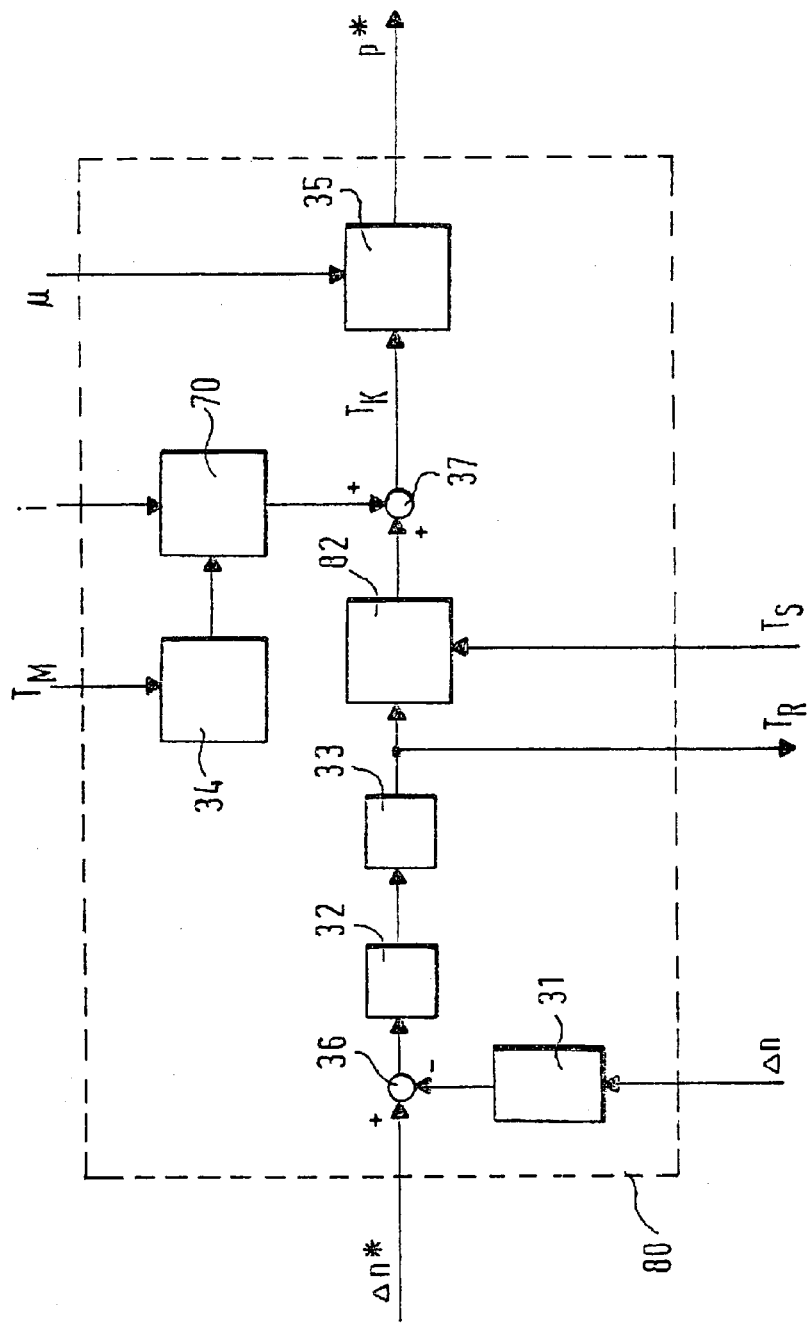
FIG. 10 shows an alternative exemplary embodiment for a slip controller.

FIG. 10 illustrates slip controller 80 in detail. Slip controller 80 differs from slip controller 21 in that it has a minimum value generator 82. Minimum value generator 82 compares differential torque $T_R$ and shock torque $T_S$ and outputs the smaller torque as an output variable.

Figure 11:
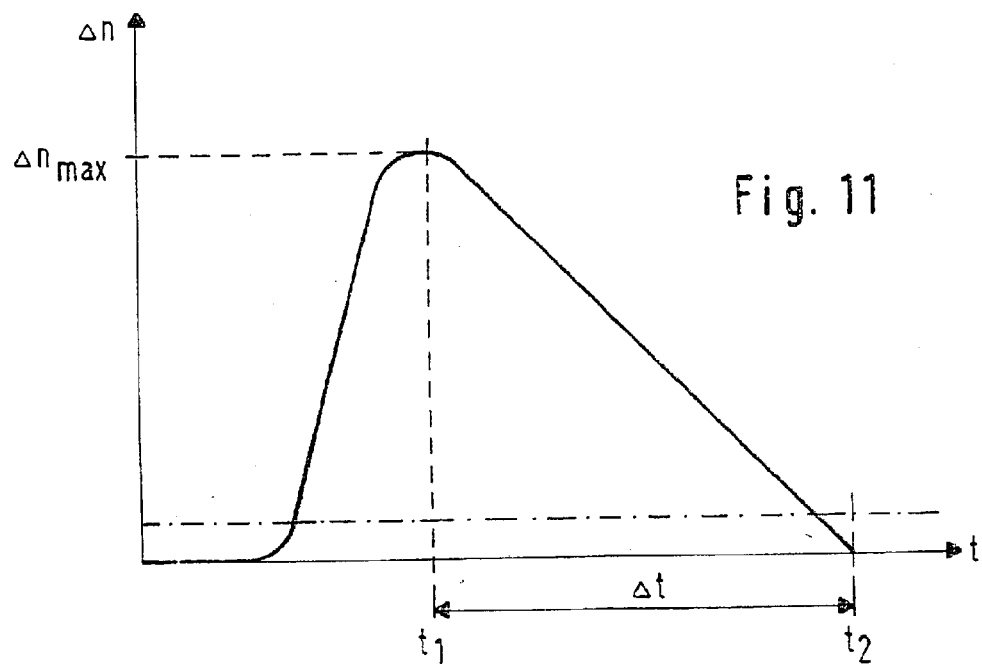
FIG. 11 shows a graph of slip plotted over time.
Figure 12:
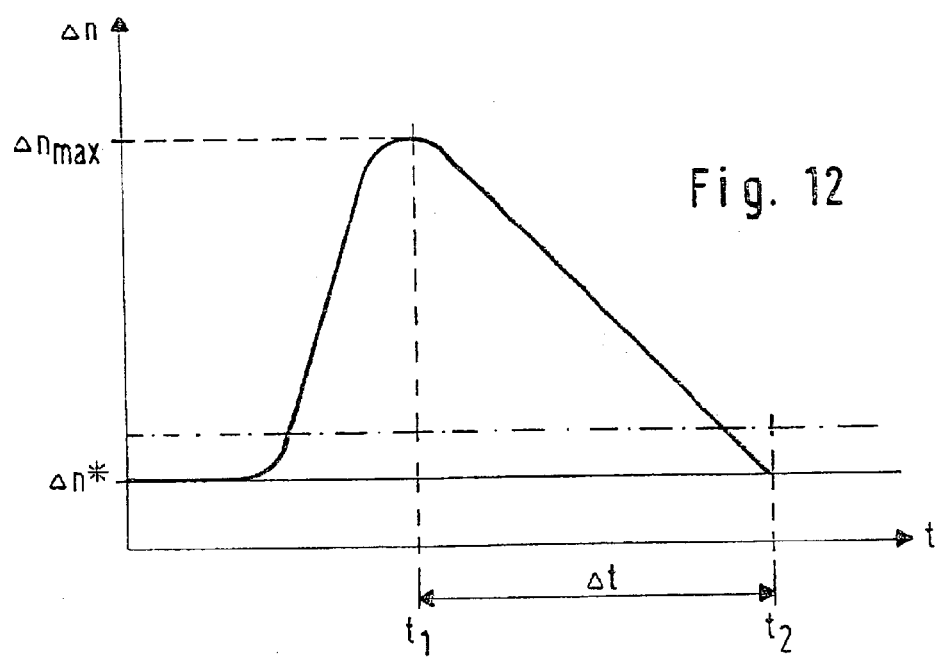
FIG. 12 shows a graph of slip plotted over time.

FIG. 11 shows a corresponding level of slip $\Delta n$ plotted over time t when using a clutch controller 79 as shown in FIG. 9. Point in time $t_1$ identifies the point in time at which the maximum permissible slip $\Delta n_{max}$ is reached and $t_2$ identifies the point in time at which the slip caused by the torque shock has decayed. The period of time between points in time $t_2$ and $t_1$ is slip time $\Delta t$. FIG. 11 shows the progression of clutch slip $\Delta n$ if setpoint clutch slip $\Delta n^*$ is equal to zero. In the event that setpoint clutch slip $\Delta n^*$ does not equal zero, FIG. 12 shows the variation of clutch slip $\Delta n$. In this case clutch slip $\Delta n$ at point of time $t_2$ is equal to setpoint clutch slip $\Delta n^*$.

In order to protect clutch 3 from thermal overload, slip time $\Delta t$ is advantageously adjusted as a function of the thermal loading in clutch 3. For this purpose, the temperature of clutch 3 is estimated using a thermodynamic model. If the estimated temperature of clutch 3 exceeds a critical temperature limit, then setpoint clutch slip $\Delta n^*$ is reduced to zero. Moreover, in an advantageous embodiment, a reserve application pressure is increased. This may be achieved, for example, by increasing value $F_0$. Alternatively, a reserve torque may be increased. This is achieved, for example, by increasing value $T_C$.

Figure 13:
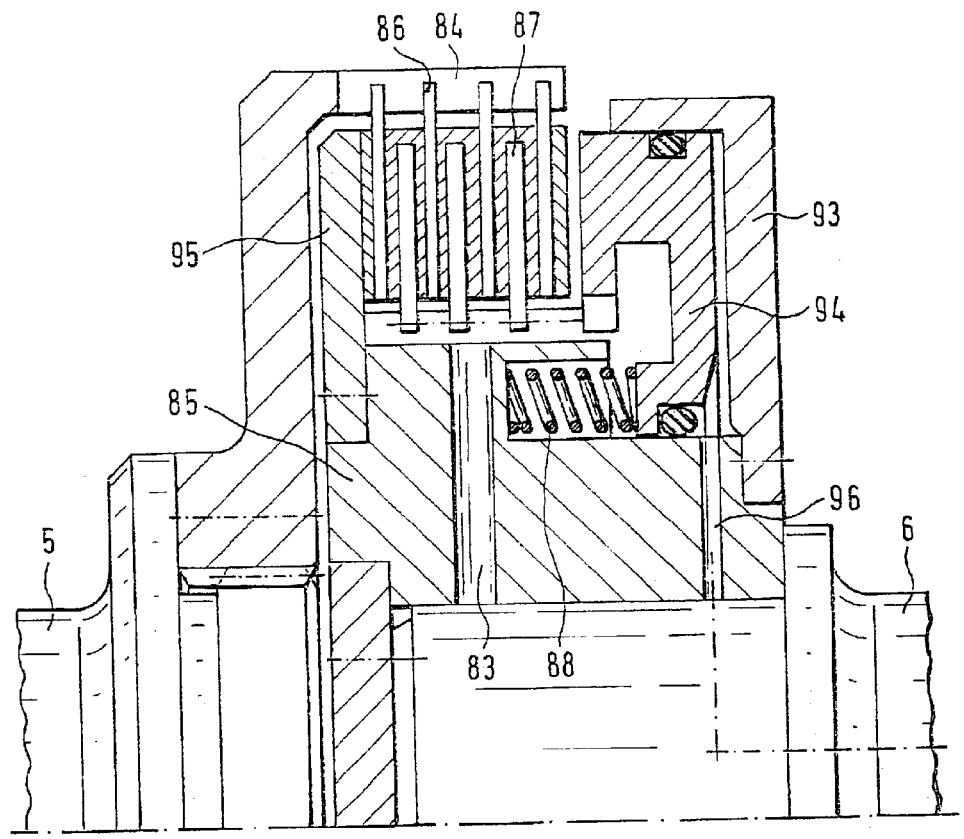
FIG. 13 shows a clutch.

FIG. 13 shows a clutch 3 in an exemplary embodiment. Reference symbol 83 identifies a lubricating oil supply for hydraulic oil, reference symbol 84 an outer driver, reference symbol 85 an inner driver, reference symbol 86 an outer blade, reference symbol 87 an inner blade, reference symbol 88 a restoring spring, reference symbol 93 a cylinder, reference symbol 94 a piston, reference symbol 95 a pressure plate and reference symbol 96 a pressure medium supply. Outer driver 84, which is connected to clutch input shaft 5, is provided with outer blades 86, and in an advantageous embodiment, with steel blades without a friction lining. Inner driver 85, which is connected to clutch output shaft 6, accommodates inner blades 87 which are coated with a friction lining. Upon the introduction of hydraulic oil at a defined pressure level via pressure medium supply 96 into cylinder 93, piston 94 moves against the force of restoring spring 88 in the direction of pressure plate 95 and presses together the blade package which has inner and outer blades 87 and 86. In order to cool the blade package, hydraulic oil is directed to inner and outer blades 87 and 86 via lubricating oil supply 83.

LIST OF REFERENCE SYMBOLS 1 engine
2 transmission
3 clutch
4 shaft
5 clutch input shaft
6 clutch output shaft
7 differential
8, 9 drive wheels
10, 11 rotational speed sensors
12, 79 clutch controller
20 subtracter
21, 80 slip controller
22 adapter
31, 34 filter
32 negater
33 regulator
35 inverse clutch model
36, 37 adder
40 start of the sequence
41, 42, 44, step
45, 46, 48,
43, 47, 60, interrogation
49 end of the sequence
50, 51 coefficient of friction-slip characteristic curve
70 multiplier
81 protection device
82 minimum value generator
83 lubricating oil supply
84 outer driver
85 inner driver
86 outer blade
87 inner blade
88 restoring spring 91 engine torque setpoint generator
93 cylinder
94 piston
95 pressure plate
96 pressure medium supply
$n_E$ rotational speed of the clutch input shaft
$n_A$ rotational speed of the clutch output shaft
$T_M$ information relating to the engine torque
$\Delta T_M$ inaccuracy of the information relating to the engine torque
$T_R$ differential torque (regulator output)
$T_K$ clutch torque
$T_1$ first tolerance value
$T_2$ second tolerance value
$\Delta n$ clutch slip
$\Delta n^*$ setpoint clutch slip
i transmission ratio of the transmission
p application pressure
p* setpoint application pressure
$\mu, \mu_1, \mu_2$ coefficient of friction
$J_1$ moment of inertia of the drive unit on the side of clutch 1, on which the internal combustion engine is situated.
$\Delta n_{max}$ maximum permissible clutch slip
$T_C$ constant torque
$\Delta t$ time period in which a torque shock causes an increase in slip
$A_R$ friction surface of the steel blades of the clutch
$Z_R$ number of friction surfaces of the clutch
$T_{MK}$ corrected engine torque
$F_0$ minimum force required for transmitting torque via the clutch
$T_S$ shock torque
$t_1$ point in time
$t_2$ point in time
r effective friction radius of the clutch

What is claimed is:

1. A method for operating a clutch between an internal combustion engine and at least one driven wheel of a vehicle, comprising:

transmitting a torque between the internal combustion engine and the at least one driven wheel by pressing the clutch together in accordance with one of an application force and an application pressure; and given a setpoint clutch slip, and when the torque is transmitted between the internal combustion engine and the at least one driven wheel, regulating the one of the application force and the application pressure as a function of a clutch slip in the clutch; and regulating the one of the application force and the application pressure by an inverse clutch model that calculates the one of the application force and the application pressure as a function of the torque transmitted by the clutch.

2. A device for operating a clutch between an internal combustion engine and at least one driven wheel of a vehicle, comprising:

an arrangement for transmitting a torque between the internal combustion engine and the at least one driven wheel by pressing the clutch together in accordance with one of an application force and an application pressure;

a slip controller for regulating the one of the application force and the application pressure as a function of a clutch slip in the clutch, when the torque is transmitted between the internal combustion engine and the at least one driven wheel, and given a setpoint clutch slip, wherein:

the slip controller includes an inverse clutch model to calculate the one of the application force and the application pressure as a function of the torque transmitted by the clutch.

3. The device according to claim 2, wherein:

the slip controller includes a controller to calculate a differential torque as a function of the clutch slip and the setpoint clutch slip.

4. The device according to claim 3, wherein:

an input value of the inverse clutch model is a function of the differential torque.

5. The device according to claim 4, wherein:

a sum of the differential torque and an engine torque generated by the internal combustion engine is an input variable of the inverse clutch model.

6. The device according to claim 2, wherein:

a coefficient of friction of the clutch is a parameter of the inverse clutch model.

7. The device according to claim 6, further comprising:

an adapter to adapt the coefficient of friction of the clutch.

* * * * *